March 24, 1959 — C. O. CHRISTENSEN — 2,878,759
BLOWER DRIVE WHEEL FOR RAILROAD REFRIGERATOR CARS
Filed Dec. 12, 1955 — 2 Sheets-Sheet 1
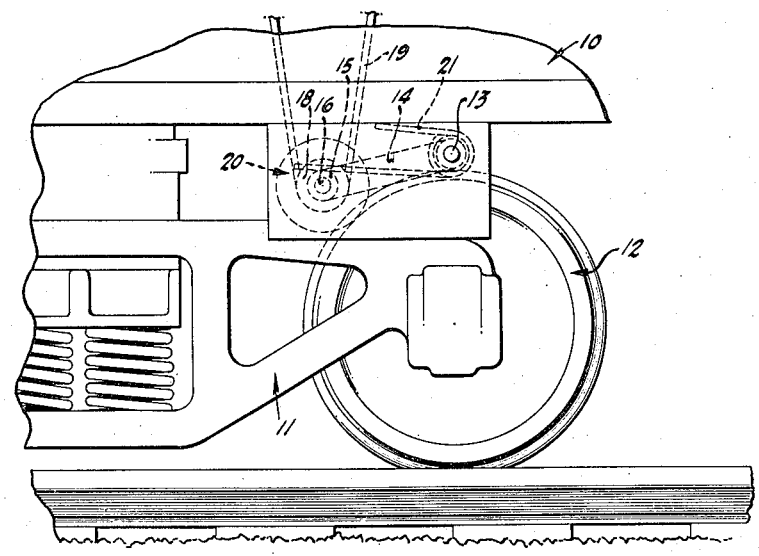
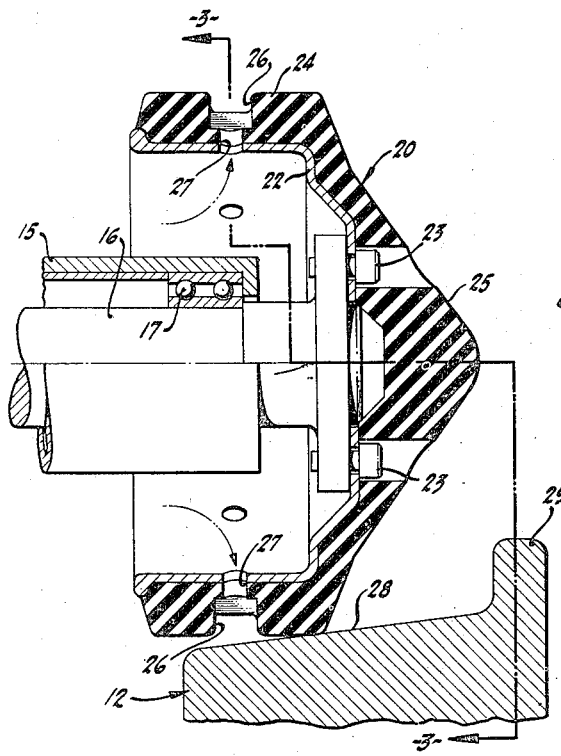
INVENTOR.
CARL O. CHRISTENSEN
BY
Mellin and Hanscom
ATTORNEYS March 24, 1959 C. O. CHRISTENSEN 2,878,759
BLOWER DRIVE WHEEL FOR RAILROAD REFRIGERATOR CARS
Filed Dec. 12, 1955 2 Sheets-Sheet 2
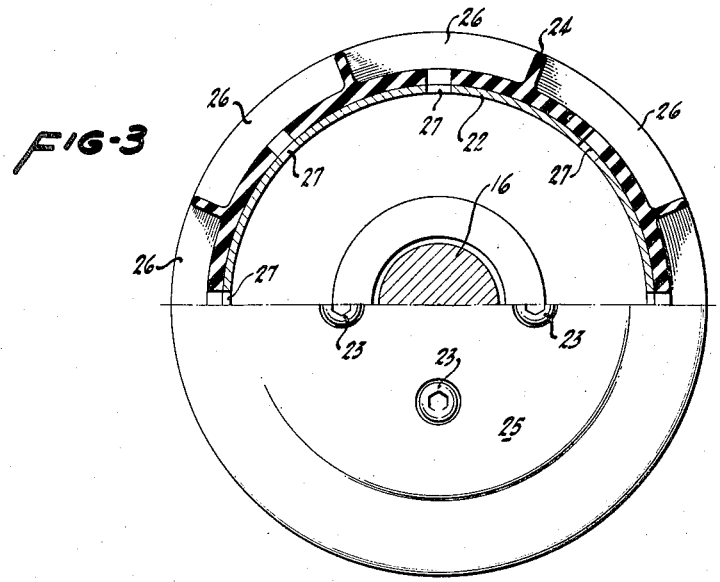
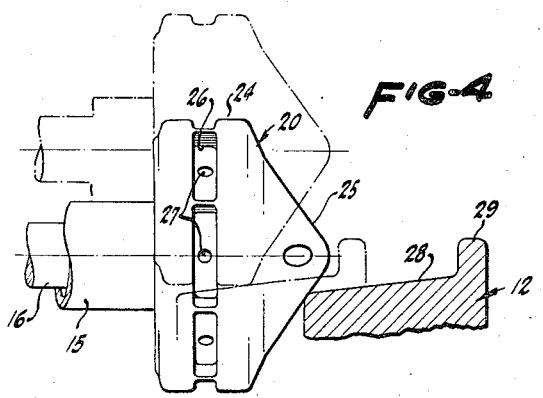 
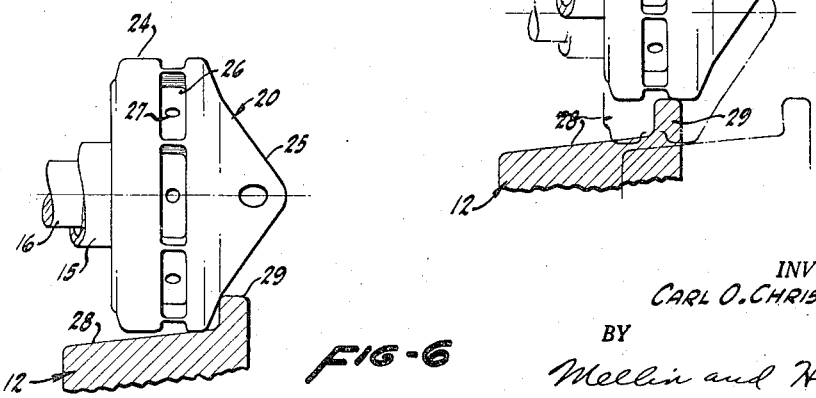
INVENTOR.
CARL O. CHRISTENSEN
BY
Mellin and Hanscom
ATTORNEYS

United States Patent Office 2,878,759
Patented Mar. 24, 1959

2,878,759

BLOWER DRIVE WHEEL FOR RAILROAD REFRIGERATOR CARS

Carl O. Christensen, Walnut Creek, Calif., assignor to Roll-Rite Corporation, Oakland, Calif., a corporation of California Application December 12, 1955, Serial No. 552,398

2 Claims. (Cl. 105—112)

This invention relates to a wheel construction, and particularly pertains to a novel wheel construction for use as the driving wheel for the blower of a railroad refrigerator car.

In prior practice, it has been customary to drive the blower of a refrigerator car by means of a drive wheel having a solid rubber tire which normally rides on the tread portion of one of the truck wheels. This drive wheel is mounted on the end of a transversely extending shaft, which is in turn pivotally supported by the car body so that the shaft and the drive wheel are permitted to raise and lower to maintain contact with the truck wheel as the truck wheel moves laterally relative to the car body when going around curves.

As set forth above, the tire of the drive wheel normally engages the relatively flat tread portion of the truck wheel. However, on extremely sharp turns, the drive wheel will drop off the outer end of the tread of the truck wheel or must ride up over the flange at the inner end of the tread.

In order to facilitate this function, the prior drive wheels were provided with an inwardly facing metal cone which either cammed the drive wheel upwardly over the flange when the truck wheel moved in one direction, or cammed the drive wheel upwardly from its dropped position to re-engage the tire with the truck wheel tread when the truck wheel returned from moving in the opposite direction.

It has been found in practice that when the truck wheel moves inwardly relative to the drive wheel so that the tire on said drive wheel drops off the tread and the metal cone is in contact with the outer edge of the truck wheel tread, the metal to metal contact allows considerable slippage between the truck wheel and the drive wheel. The slippage between the wheels not only results in the stopping of the blower drive but also causes excessive wear on the metal cone, and in a relatively short time shears off the cone. When the truck wheel subsequently tries to return to its normal position, the blower drive wheel is not cammed upwardly and considerable damage is caused to the blower drive assembly.

It is the principal object of this invention to provide a novel form of blower drive wheel to eliminate the metal to metal contact between the blower drive wheel and the truck wheel to reduce or eliminate slippage therebetween.

A further object of the invention is to provide a novel form of blower drive wheel as set forth above, wherein radial openings are provided in the tread portion of the wheel to cause airflow therethrough to aid in cooling the wheel.

A preferred embodiment of the invention is described in the following detailed specification, and illustrated by way of example in the accompanying drawings, wherein:

Fig. 1 is a fragmentary side view of a railroad refrigerator car embodying the principles of my invention.

Fig. 2 is a sectional view of a drive wheel constructed in accordance with the principles of the invention and shown in its normal position with the truck wheel centered in its straight ahead position.

Fig. 3 is a sectional view taken generally on line 3—3 of Fig. 2.

Fig. 4 illustrates the relationship between the drive wheel and the truck wheel in one extreme position of the truck wheel. The straight ahead position is shown in dot-dash lines.

Fig. 5 illustrates the relationship between the drive wheel and the truck wheel in the extreme position opposite to that shown in Fig. 4.

Fig. 6 illustrates the relationship of the wheels at a position intermediate to that shown in Figs. 2 and 5, and particularly shows the relationship between the cone portion of the blower drive wheel and the flange on the truck wheel.

Referring now to the drawings, wherein similar reference numerals are used to denote the various elements throughout the various views shown, 10 generally designates the body of a railroad refrigerator car, and 11 generally indicates the truck thereof having a wheel 12 incorporated therein.

Referring now particularly to Fig. 1, a shaft 13 is fixed to the underside of the car 10 adjacent the outer edge thereof and extends transversely with respect thereto. A pair of arms, one of which is shown at 14, is pivotally mounted on the shaft 13 and extends in a direction perpendicular thereto. A sleeve 15 is fixed to the opposite ends of the arms whereby the sleeve 15 is parallel to but adapted to pivot about the axis of the shaft 13. A second shaft 16 is rotatably supported by the sleeve 15 by suitable bearings 17 therebetween.

A pulley 18 is fixed to the outer end of the shaft 16 and is connected to the blower of the car 10 by a belt 19. A drive wheel 20 is fixed to the inner end of the shaft 16 and bears against the truck wheel 12 in the manner shown in Fig. 2. A torsion spring 21 surrounds the shaft 13 and normally urges the arm 14 and its associated arm (not shown) counter clockwise to maintain the drive wheel 20 in contact with the truck wheel 12.

The drive wheel 20 comprises a bowl-shaped metal casting 22 adapted to be fixed to the inner end of the shaft 16 by a plurality of bolts 23. An integral tire portion 24 and cone cam portion 25, both made of rubber or similar material, are bonded to the outer surface of the casting 22. A plurality of circumferentially extending grooves 26 are cut into the central part of the tire portion, and a radial bore 27 connects the center of each of the grooves 26 with the area within the bowl-shaped casting 22, in the manner shown in Fig. 3. When the wheel 20 rotates, air flow will be induced into the central portion of the casting 22 and outwardly through the bores 27 and grooves 26, in the manner illustrated by the arrows in Fig. 2, to cool the tire portion 24 of the wheel.

In the operation of the car, the drive wheel 20 normally rides with the tire portion 24 thereof in contact with the tread portion 28 of the truck wheel 12 in the manner shown in Fig. 2. On sharp turns, where the truck wheel 12 moves inwardly relative to the drive wheel 20 a relatively large amount, the drive wheel will drop off the outer edge of the tread portion 28 in the manner shown in Fig. 4, and the surface of the cone portion 25 will be in engagement with the outer edge of the truck wheel tread portion 28. As the truck wheel 12 moves back to its central position, the cam surface of the cone portion 25 will raise the drive wheel 20 back to its normal position shown in dot-dash lines.

Similarly, when the truck wheel 12 moves outwardly to its other extreme position, illustrated in Fig. 5, the cam surface of the cone 25 will contact the flange 29 on the truck wheel 12, in the manner illustrated in Fig. 6, to raise the drive wheel 20 so that the tire portion 24 thereof will ride on the edge of the flange 29. When the truck wheel returns from the position shown in Fig. 5 to that shown in Fig. 2, the drive wheel 20 will again drop down to its normal position under the influence of the torsion spring 21.

While I have shown and described the preferred embodiment of my invention, it is obvious that various changes may be made in its construction by those skilled in the art, without departing from the spirit of the invention as defined in the appended claims.

Having thus described my invention, what I claim and desire to secure by Letters Patent is:

1. A drive wheel construction for cooperating with the truck wheel of a railroad car comprising a bowl-shaped metal casting having an annular rim portion and a disc portion integral with one edge of said annular rim, an annular rubber tire bonded to the outer surface of said annular rim, a rubber cone integral with one edge of said annular tire and having the base thereof bonded to the outer surface of said disc, and a plurality of radial bores through said rim and said tire to provide for the passage of air from the interior of said casting through said tire.

2. A drive wheel construction for cooperating with the truck wheel of a railroad car comprising a bowl-shaped metal casting having an annular rim portion and a disc portion integral with one edge of said annular rim, an annular rubber tire bonded to the outer surface of said annular rim, a rubber cone integral with one edge of said annular tire and having the base thereof bonded to the outer surface of said disc, a plurality of circumferentially spaced and circumferentially extending grooves formed in the outer surface of said tire, and a plurality of radial bores through said rim and said tire connecting said grooves with the interior of said casting to provide for the passage of air from the interior of said casting to said grooves.

References Cited in the file of this patent

UNITED STATES PATENTS

| | | |
|---|---|---|
| 1,664,567 | McPherson | Apr. 3, 1928 |
| 1,813,502 | Madsen | July 7, 1931 |
| 2,151,566 | Sander | Mar. 21, 1939 |
| 2,519,170 | Beemer et al. | Aug. 15, 1950 |
| 2,732,811 | Breen | Jan. 31, 1956 |
| 2,732,812 | Breen | Jan. 31, 1956 |
| 2,757,619 | Beemer et al. | Aug. 7, 1956 |